No. 864,318.
PATENTED AUG. 27, 1907.
F. W. LORD.
HEATER FOR CARS.
APPLICATION FILED MAR. 19, 1907.
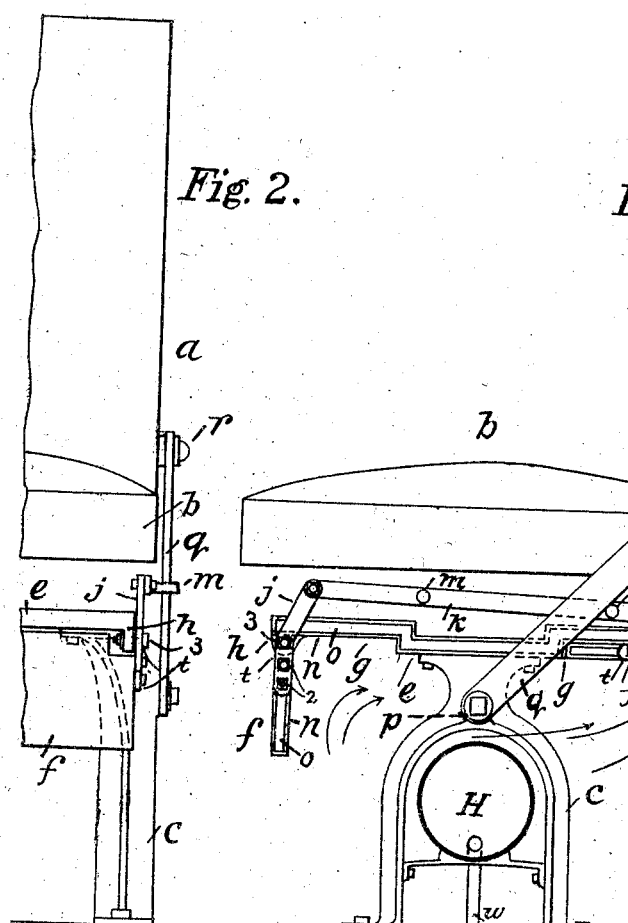
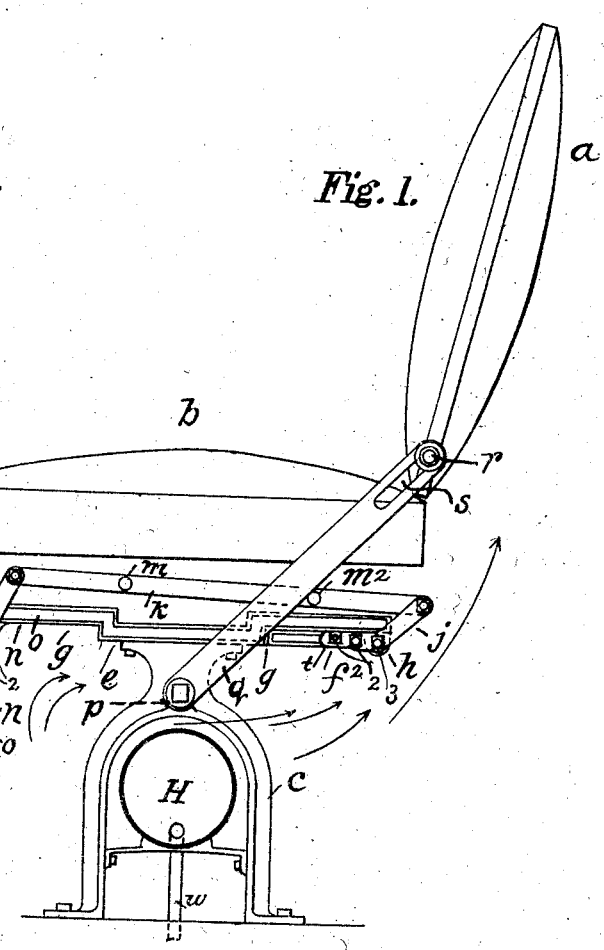

UNITED STATES PATENT OFFICE.

FREDERIC W. LORD, OF NEW YORK, N. Y.

HEATER FOR CARS.

No. 864,318.  Specification of Letters Patent.  Patented Aug. 27, 1907.

Application filed March 19, 1907. Serial No. 363,168.

*To all whom it may concern:*

Be it known that I, FREDERIC W. LORD, residing at New York, in the county of New York and State of New York, have invented certain Improvements in Heaters for Cars, of which the following is a specification.

The invention about to be described relates to heating apparatus applied to passenger cars in which the heat radiators are placed under the seats, and the air which becomes heated by contact with the radiators rises and passes over the sides and ends of the seats.

In the common arrangement of such heaters, the coils, whether steam or hot water coils or electric coils, are placed in suitable supports under the car seat, and the heated air in arising passes around the sides and ends of the seat, and into the body of the seat, all of which tends to the discomfort of the persons occupying the seat.

The present invention consists in a heat insulator and deflector, by means of which the heated air arising from the heater is prevented from permeating the seat body, and also prevented from arising on the front side of the seat and unduly heating the lower limbs of passengers, and directed so that it passes up the rear of the seat back, thus heating the car and providing sufficient heated air in the vicinity of the passengers, for all purposes of comfort.

As the seats in passenger cars are reversible, I have also arranged the device so that when the back of the car seat is reversed it automatically operates the heat deflector, so that in whatever position the back of the seat is, the heated air is prevented from passing up the front of the seat, and directed up the rear side thereof. All of which I will now proceed to describe and point out in the appended claims.

In the drawings which illustrate the invention,— Figure 1 is an end view of a passenger car seat showing the invention. Fig. 2 is a partial front view of the car seat.

In the drawings, the mechanism by which the back $a$ of the seat is reversed is not shown as it forms no part of the invention, and is left off to avoid complication in the drawings. The car seat or body $b$ is attached to the seat-frame or floor braces $c$, and is immovable, while the back $a$ is made to be shifted from one side of the seat to the other, all in a manner well understood. A horizontal heat-deflector $e$ extends between the seat $b$ and a heater H placed low down in the frame $c$ and supported thereby; the deflector $e$ is not quite as wide as the seat, and extends nearly the length of the seat, but this is not material. The deflector is bolted to the frame $c$ and is offset on each side to provide the recesses $g$, $g$, and at each corner of the deflector are provided lugs $h$, $h$, to which are pivoted the wings or aprons $f$, $f^2$. Both the part $e$ and the wings $f$, $f^2$ are hollow and made from sheet metal, and the spaces $o$ between the metal sides $n$ and ends are filled with heat-insulating material, such as sheet asbestos, magnesia, or other cellular substance. The levers $j$ are connected to the wings by the bolts 2 passing through their extensions $t$ into the wings and are pivoted to the lugs $h$, by the bolts 3, the upper ends of the levers $j$, $j$ are pivoted to the bar $k$, which is provided with the two studs $m$, $m^2$ extending outwardly. A lever $q$ pivoted to the frame $c$ at $p$ passes between the studs $m$, $m^2$ and has a slot $s$ in its upper end through which passes the bolts $r$, which secure the same to the seat back.

The heater H may be a coil for the passage of steam or hot water, or may be an electric coil wound upon a porcelain tube in a well known manner, and I have in the drawing simply indicated the heater as a hollow receptacle for steam or hot water supplied by the pipe $w$.

In the normal condition of the car seat, when the back $a$ is in the position shown in the drawings, the apron or wing $f$ is dropped down in front of the seat, and the apron $f^2$ is folded up into its recess $g$, and in this position the heated air arising from the surface of the heater is prevented from flowing to the forward side of the seat by the insulating apron $f$, and from reaching the underside of the seat by the insulating horizontal stable portion $e$, and is therefore deflected to the rear side of the seat back as indicated by the arrows. When the seat back is reversed, by mechanism not shown, the back in passing over the seat carries along the lever $q$ (the slot $s$ in its end permitting the lever to be so carried) which has been supported on the stud $m^2$, until the lever strikes the stud $m$, when the lever $k$ is carried along and the apron $f$ is folded into its recess $g$ and the apron $f^2$ is dropped down, so that what was the rear side of the seat now becomes the front side, and the apron $f^2$ now becomes the heat-shield or deflector in front of the seat, while the folding of the apron $f$ into the recess permits heated air to pass up the rear of the seat.

As will be readily understood, I may vary the construction of the deflector and wings without departing from the spirit of the invention, and provide means whereby the air in a car may be heated and the passengers rendered comfortable, without the excessive heating of the lower limbs of the body, and the discomfort arising from heated air passing through the seat of the car.

I claim as my invention—

1. In combination with a seat having a reversible back, of a heat radiator, and a heat deflector between the seat and radiator, adapted to automatically shield one side of the seat when the back is reversed.

2. In combination with a seat having a reversible back, of a heat radiator, and a heat insulator and deflector between the seat and radiator, adapted to automatically shield one side of the seat when the back is reversed.

3. In combination with a seat, of a heat radiator, and a heat deflector between the seat and radiator, adapted when operated, to shield one side of the seat and provide a passage for heated air around the opposite side of the seat.

4. In combination with a seat having a reversible back, of a heat radiator, and a heat insulator and deflector between the seat and radiator, having a central stable portion and a hinged wing at each side thereof adapted when the back is reversed to automatically extend one wing and fold the other.

5. In combination with a car seat having a reversible back, of a heat radiator, and a heat deflector between the seat and radiator provided with a hinged wing at each side thereof adapted when the back is reversed to automatically drop one wing and fold up the other.

6. In combination with a car seat having a reversible back, of a heat radiator, and a heat deflector between the seat and radiator having a central horizontal stable portion and a hinged wing or apron at each side thereof composed of heat-insulating material covered with sheet metal, and means for automatically dropping one wing or apron and folding the other when the back is reversed.

7. In combination with a car seat having a reversible back, a heat radiator, and a heat deflector between the seat and radiator having a central horizontal stable portion extending the length of the seat and a hinged wing or apron at each side thereof composed of heat-insulating material covered with sheet metal, a lever attached to each wing or apron, a bar connecting said levers, said bar being provided with two studs, and a lever pivoted to the seat frame and to the back adapted to vibrate between said studs and operate the wings or aprons.

In testimony whereof, I have signed my name to this specification in the presence of two subscribing witnesses, this 16th day of March, 1907.

FREDERIC W. LORD.

Witnesses:
J. M. WATTERS,
FRANK W. GARRISON.